United States Patent
Takasaki et al.

(10) Patent No.: US 11,897,980 B2
(45) Date of Patent: Feb. 13, 2024

(54) LAMINATED RESIN SHEET FOR MOLDING, AND MOLDED ARTICLE USING SAME

(71) Applicants: MITSUBISHI GAS CHEMICAL COMPANY, INC., Tokyo (JP); MGC FILSHEET CO., LTD., Saitama (JP)

(72) Inventors: Masato Takasaki, Osaka (JP); Atsuhiro Tokita, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 17/793,729

(22) PCT Filed: Feb. 3, 2021

(86) PCT No.: PCT/JP2021/003805
§ 371 (c)(1),
(2) Date: Dec. 27, 2022

(87) PCT Pub. No.: WO2021/166636
PCT Pub. Date: Aug. 26, 2021

(65) Prior Publication Data
US 2023/0145247 A1    May 11, 2023

(30) Foreign Application Priority Data
Feb. 18, 2020 (JP) .................. 2020-025011

(51) Int. Cl.
| | |
|---|---|
| C08F 220/14 | (2006.01) |
| B32B 7/027 | (2019.01) |
| B32B 7/02 | (2019.01) |
| B32B 27/08 | (2006.01) |
| B32B 27/30 | (2006.01) |
| B32B 27/32 | (2006.01) |

(Continued)

(52) U.S. Cl.
CPC ............ *C08F 220/14* (2013.01); *B32B 7/02* (2013.01); *B32B 7/027* (2019.01); *B32B 27/08* (2013.01);

(Continued)

(58) Field of Classification Search
CPC ........................... B32B 27/00–27/42
See application file for complete search history.

(56) References Cited

U.S. PATENT DOCUMENTS

| | | |
|---|---|---|
| 2009/0252935 A1 | 10/2009 | Koyama et al. |
| 2020/0247098 A1 | 8/2020 | Tokita et al. |
| 2022/0056224 A1 | 2/2022 | Tokita et al. |

FOREIGN PATENT DOCUMENTS

| | | | |
|---|---|---|---|
| JP | 2003-145616 A | | 5/2003 |
| JP | 2003145616 A | * | 5/2003 |

(Continued)

OTHER PUBLICATIONS

Machine translation of JP2014-141088. Retrieved Apr. 24, 2023.*

(Continued)

*Primary Examiner* — Prashant J Khatri
(74) *Attorney, Agent, or Firm* — GREENBLUM & BERNSTEIN, P.L.C.

(57) ABSTRACT

Provided are: a laminated resin sheet for molding, which is less likely to cause an abnormal appearance during molding, and has an anti-glare layer but has excellent transparency; and a molded article using the same. This laminated resin sheet for molding comprises: a high-hardness resin layer containing a high-hardness resin; a base material layer which contains a polycarbonate resin (a1) and is disposed on one surface side of the high-hardness resin layer; and a hard coat anti-glare layer disposed on the other surface side of the high-hardness resin layer, wherein the glass transition point (Tg1) of the high-hardness resin and the glass transition point (Tg2) of the polycarbonate resin (a1) satisfy the following relationship, and the maximum valley depth (Rv) of the recesses and protrusions of the hard coat anti-glare layer is at most 0.9 μm $-10°\ C. \leq (Tg1-Tg2) \leq 40°\ C.$

13 Claims, 1 Drawing Sheet

(51) Int. Cl.
  *B32B 27/36* (2006.01)
  *C09D 5/00* (2006.01)
(52) U.S. Cl.
  CPC ............ *B32B 27/30* (2013.01); *B32B 27/302* (2013.01); *B32B 27/308* (2013.01); *B32B 27/32* (2013.01); *B32B 27/36* (2013.01); *B32B 27/365* (2013.01); *C09D 5/006* (2013.01); *B32B 2250/24* (2013.01); *B32B 2255/10* (2013.01); *B32B 2255/26* (2013.01); *B32B 2270/00* (2013.01); *B32B 2307/414* (2013.01); *B32B 2307/732* (2013.01)

(56) References Cited

FOREIGN PATENT DOCUMENTS

| | | | |
|---|---|---|---|
| JP | 2009-234184 A | 10/2009 | |
| JP | 2014034112 A | * 2/2014 | |
| JP | 2014-141088 A | 8/2014 | |
| JP | 2014141088 A | * 8/2014 | ............ B29C 48/21 |
| JP | 2019-77097 A | 5/2019 | |
| WO | 2019/049704 A1 | 3/2019 | |
| WO | 2019/198581 A1 | 10/2019 | |
| WO | 2020/179524 A1 | 9/2020 | |
| WO | 2021/029266 A1 | 2/2021 | |

OTHER PUBLICATIONS

Machine translation of JP2003-145616. Retrieved May 4, 2023.*
Machine translation of JP2014034112. Retrieved Nov. 14, 2023.*
International Search Report and Written Opinion of the International Searching Authority issued in International Patent Application No. PCT/JP2021/003805, dated Apr. 27, 2021, along with an English translation thereof.
Extended European Search Report issued in European Patent Application No. 21756292.5 dated Jun. 30, 2023.

* cited by examiner

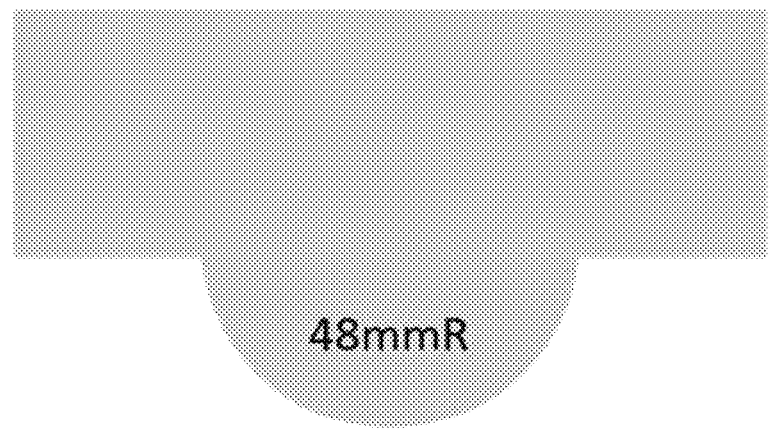
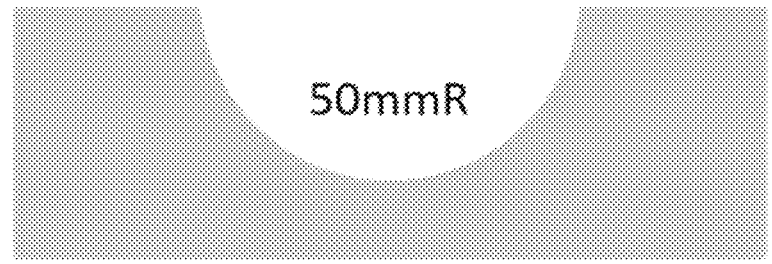

LAMINATED RESIN SHEET FOR MOLDING, AND MOLDED ARTICLE USING SAME

TECHNICAL FIELD

The present invention relates to a laminated resin sheet for molding and a molded article using the same.

BACKGROUND ART

Resin molded bodies are used for automobile interior parts such as instrument covers, cases of home appliances, office automation equipments, personal computers and small portable devices, touch panel type display surfaces of mobile phone terminals and the like, etc. Resin molded bodies to be used for these applications are produced by molding resin sheets for molding.

Conventionally, for imparting characteristics according to the applications, various devices such as layering of a hard coat layer and decoration are applied to the aforementioned resin sheets for molding. As one of such devised methods, a method of providing an anti-glare layer on a resin sheet is known. Regarding the anti-glare layer, by providing the anti-glare treatment by which a fine structure or shape is imparted to the surface of the layer, functions such as the improvement of visibility by preventing reflection of light (anti-glare properties) and making fingerprints inconspicuous can be imparted.

As resins suitable for the above-described applications, polycarbonate (PC) resins are attracting attention. PC resins are known as engineering plastics excellent in transparency, lightweight properties, and impact resistance; and suitably applied to the above-described applications.

For example, Patent Document 1 describes an invention related to a multilayer film for sticking simultaneously with injection molding, which is characterized in that a layer (B) made of a methacrylic resin and acrylic rubber particles is layered on at least one surface of a layer (A) made of a polycarbonate resin. Patent Document 1 describes that the polycarbonate resin was selected as a resin film having high heat resistance. Regarding the invention of Patent Document 1, it is described that the layer (B) is used as a surface decorating film; and that when blending organic or inorganic fine particles in the layer (A) and/or the layer (B), a light diffusing matte layer is obtained.

PRIOR ART DOCUMENTS

Patent Documents

Patent Document 1: Japanese Patent Publication No. 2009-234184

SUMMARY OF THE INVENTION

Problems to be Solved by the Invention

However, for example, when producing a laminated resin sheet, in which, on a polycarbonate (PC) resin layer, a layer having different physical properties is layered, like Patent Document 1, there is a case where an abnormal appearance is caused at the time of molding. Further, when a layer subjected to the anti-glare treatment is layered on a polycarbonate (PC) resin layer, there is a case where the haze is higher and transparency of the polycarbonate (PC) resin is reduced.

Under such circumstances, the present invention aims to provide a laminated resin sheet for molding, which is less likely to cause an abnormal appearance at the time of molding, and has an anti-glare layer but has excellent transparency; and a molded article using the same.

Means for Solving the Problems

The present inventors diligently made researches in order to solve the above-described problems. As a result, the present inventors found that the above-described problems can be solved by providing a hard coat anti-glare layer, which is obtained by subjecting a hard coat layer to a predetermined anti-glare treatment, to a polycarbonate (PC) resin layer; and providing a predetermined high hardness resin layer between the PC resin layer and the hard coat anti-glare layer; and thus the present invention was achieved. Specifically, the present invention is, for example, as described below.

<1> A laminated resin sheet for molding, which comprises:

a high hardness resin layer containing a high hardness resin;

a base material layer which contains a polycarbonate resin (a1) and is disposed on one surface side of the high hardness resin layer; and a hard coat anti-glare layer disposed on the other surface side of the high hardness resin layer, wherein the glass transition point (Tg1) of the high hardness resin and the glass transition point (Tg2) of the polycarbonate resin (a1) satisfy the following relationship:

$$-10°\text{ C.} \leq (Tg1-Tg2) \leq 40°\text{ C.},$$

wherein the maximum valley depth (Rv) of the recesses and protrusions of the hard coat anti-glare layer is 0.9 μm or less.

<2> The laminated resin sheet for molding according to item <1>, wherein the polycarbonate resin (a1) is an aromatic polycarbonate resin.

<3> The laminated resin sheet for molding according to item <2>, wherein the aromatic polycarbonate resin contains a structural unit represented by general formula (3a):

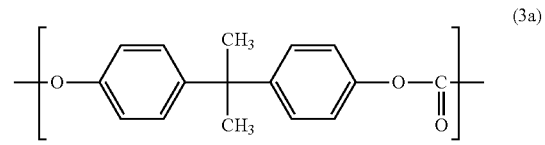

<4> The laminated resin sheet for molding according to any one of items <1> to <3>, wherein the content of the polycarbonate resin (a1) is 75 to 100% by mass relative to the total mass of the base material layer.

<5> The laminated resin sheet for molding according to any one of items <1> to <4>, wherein the high hardness resin comprises at least one selected from the group consisting of:

Resin (B1), which is a copolymer containing a (meth) acrylic acid ester structural unit (a) represented by general formula (1) below:

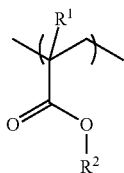

(1)

(wherein R¹ represents a hydrogen atom or a methyl group, and R² represents a C1-18 alkyl group), and an aliphatic vinyl structural unit (b) represented by general formula (2) below:

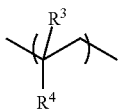

(2)

(wherein R³ represents a hydrogen atom or a methyl group, and R⁴ is a cyclohexyl group which may be substituted with a C1-4 hydrocarbon group);

Resin (B2), which is a copolymer containing 6 to 77% by mass of a (meth)acrylic acid ester structural unit, 15 to 71% by mass of a styrene structural unit, and 8 to 23% by mass of an unsaturated dicarboxylic acid structural unit;

Resin (B3), which is a polymer containing a structural unit (c) represented by general formula (5) below:

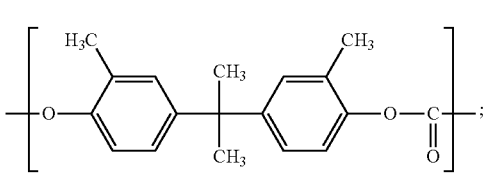

(5)

Resin (B4), which is a copolymer containing 5 to 20% by mass of a styrene structural unit, 60 to 90% by mass of a (meth)acrylic acid ester structural unit, and 5 to 20% by mass of an N-substituted maleimide structural unit;

Resin (B5), which is a polymer containing a structural unit (e) represented by general formula (7) below:

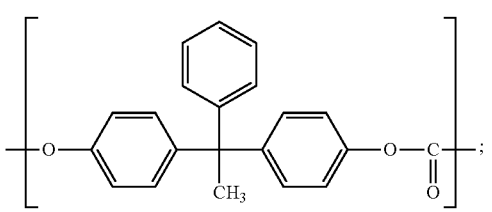

(7)

and

Resin (B6), which is a copolymer containing 50 to 95% by mass of a styrene structural unit and 5 to 50% by mass of an unsaturated dicarboxylic acid structural unit.

<6> The laminated resin sheet for molding according to item <5>, wherein the Resin (B3) is a copolymer further containing a structural unit (d) represented by general formula (6) below:

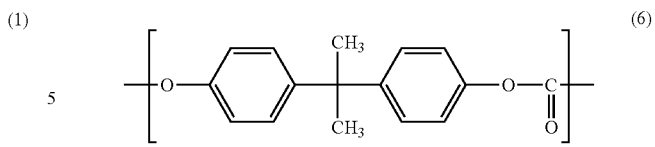

(6)

<7> The laminated resin sheet for molding according to any one of items <1> to <6>, wherein the content of the high hardness resin is 70 to 100% by mass relative to the total mass of the high hardness resin layer.

<8> The laminated resin sheet for molding according to any one of items <1> to <7>, wherein the total thickness of the base material layer and the high hardness resin layer is 0.5 to 3.5 mm.

<9> The laminated resin sheet for molding according to any one of items <1> to <8>, wherein the ratio of the thickness of the base material layer in the total thickness of the base material layer and the high hardness resin layer is 75% to 99%.

<10> The laminated resin sheet for molding according to any one of items <1> to <9>, wherein the pencil hardness of the surface of the hard coat anti-glare layer is 2H or harder.

<11> The laminated resin sheet for molding according to any one of items <1> to <10>, wherein:
a laminated protective film, in which a first protective film and a second protective film are layered, is disposed on both the outermost surfaces of the laminated resin sheet for molding; and
the second protective film is disposed at the outer side.

<12> The laminated resin sheet for molding according to item <11>, which has the laminated protective film, wherein:
the first protective film is a polyolefin-based film having a melting point of 100 to 130° C.; and
the second protective film is a polyolefin-based film having a melting point of 140° C. or higher.

<13> The laminated resin sheet for molding according to item <11> or <12>, which has the laminated protective film, wherein:
the first protective film is a polyolefin-based film having a melting point of 100 to 130° C.; and
the second protective film is a PET-based film.

<14> The laminated resin sheet for molding according to any one of items <1> to <13>, which has a haze of 12% or less.

<15> A molded article obtained by molding with use of the laminated resin sheet for molding according to any one of items <1> to <14>.

Advantageous Effect of the Invention

According to the present invention, a laminated resin sheet for molding, which is less likely to cause an abnormal appearance at the time of molding, and has an anti-glare layer but has excellent transparency; and a resin molded article using the same are provided.

BRIEF DESCRIPTION OF THE DRAWINGS

FIG. 1 is a schematic figure of an aluminum mold for hot pressing used for subjecting the laminated resin sheet for molding to hot press molding in the Examples.

BEST MODE FOR CARRYING OUT THE INVENTION

Hereinafter, the present invention will be described in detail by way of production examples, working examples, etc., but the present invention is not limited thereto and can be arbitrarily changed and then practiced within a range not departing from the gist of the present invention.

The laminated resin sheet for molding of the present invention (hereinafter sometimes referred to as just "resin sheet") comprises: a high hardness resin layer containing a high hardness resin; a base material layer which contains a polycarbonate resin (a1) and is disposed on one surface side of the high hardness resin layer; and a hard coat anti-glare layer disposed on the other surface side of the high hardness resin layer. That is, the base material layer, the high hardness resin layer, and the hard coat anti-glare layer are disposed in this order. An additional layer may exist between the base material layer and the high hardness resin layer; and between the high hardness resin layer and the hard coat anti-glare layer, respectively. The additional layer is not particularly limited, and examples thereof include an adhesive layer and a primer layer. The additional layer is not required to be present. According to one embodiment, a base material layer, a high hardness resin layer, and a hard coat anti-glare layer are mutually layered. Specifically, the laminated resin sheet for molding comprises: a high hardness resin layer containing a high hardness resin; a base material layer which contains a polycarbonate resin (a1) and is layered on one surface of the high hardness resin layer; and a hard coat anti-glare layer layered on the other surface of the high hardness resin layer.

It is sufficient when the high hardness resin layer and the hard coat anti-glare layer are provided on at least one surface side of the base material layer, and the constitution of the other side is not particularly limited. Further, the high hardness resin layer may be provided on both sides of the base material layer, and in this case, the hard coat anti-glare layer may be provided on one or both of the high hardness resin layers. When the high hardness resin layer is provided on both sides of the base material layer, it is desirable to use the same high hardness resin for the two high hardness resin layers for obtaining a stable resin sheet with little warpage.

The glass transition point (Tg1) of the high hardness resin and the glass transition point (Tg2) of the polycarbonate resin (a1) satisfy the following relationship:

$$-10° C. \leq (Tg1-Tg2) \leq 40° C.,$$

Specifically, (Tg1−Tg2) is −10 to 40° C., preferably −5 to 30° C., and more preferably 0 to 30° C. In this case, it is possible to prevent the generation of an abnormal appearance such as a crack and a flow mark at the time of molding. Specifically, the molding temperature at the time of molding is usually set at a molding temperature suitable for a resin whose amount in the layers is the largest. In the case of a resin sheet in which a polycarbonate resin is used as a base material layer, since the amount of the polycarbonate resin contained is usually the largest, thermoforming is performed at a molding temperature suitable for the polycarbonate resin. Regarding the molding temperature that is set in the above-described way, when Tg of the high hardness resin is extremely lower than Tg of the polycarbonate resin (a1), the high hardness resin is in a rubbery state or molten state at the time of thermoforming and is easily moved. In this case, the hard coat anti-glare layer, which is still hard even when it is heated, cannot follow the movement of the high hardness resin that has become easily movable, and a crack is easily generated. Meanwhile, when Tg of the high hardness resin is too much higher than Tg of the polycarbonate resin (a1), the difference between the viscosity of the high hardness resin and the viscosity of the polycarbonate resin becomes larger, and when these resins are layered, the interface becomes rough and a flow mark may be generated.

When the high hardness resin layer is interposed between the resin layer and the hard coat anti-glare layer, it is preferred because a laminated resin sheet obtained may have high hardness. By interposition of the high hardness resin layer, high hardness can be realized because buckling of the hard coat layer having a relatively low elastic modulus can be prevented or suppressed.

Further, the maximum valley depth (Rv) of the recesses and protrusions of the hard coat anti-glare layer is 0.9 μm or less, preferably 0.8 μm or less, and more preferably 0.6 μm or less. When the maximum valley depth (Rv) of the recesses and protrusions of the hard coat anti-glare layer is 0.9 μm or less, the haze is smaller, and excellent transparency is obtained even when a laminated resin sheet obtained has a hard coat anti-glare layer. Moreover, when the maximum valley depth (Rv) of the recesses and protrusions of the hard coat anti-glare layer is 0.9 μm or less, an abnormal appearance such as a crack can be prevented. Specifically, a stress is applied to the hard coat anti-glare layer at the time of molding, but when the maximum valley depth (Rv) of the recesses and protrusions of the hard coat anti-glare layer is 0.9 μm or less, it is preferred because the generation of a crack starting from a deep recess due to the aforementioned stress is not caused or hardly caused.

Note that since the anti-glare treatment is applied to the hard coat layer, the laminated resin sheet for molding may have high scratch resistance.

The above-described laminated resin sheet for molding can be suitably used for the production of a molded article having a curved shape that requires hardness. For example, since a component part having a curved portion that is continuous with a plane portion can be successfully produced, it is also possible to provide a product having a novel design or function.

When molded articles having the above-described shape are produced using conventional resin sheets, many defects such as a crack are generated at the time of thermoforming such as hot press molding, vacuum forming, pressure forming, and TOM molding. For this reason, it is required to devise a method in which, for example, the hardness of a hard coat is reduced, in order to suppress the generation of a crack at the time of thermoforming. However, when the hardness of the hard coat is reduced, though thermoformability is improved, but new problems such as easiness of damaging and reduction in chemical resistance are caused because the hard coat is soft.

Meanwhile, according to the present invention, since the generation of a crack is suppressed as described above, a resin sheet that can be thermoformed can be provided without reducing the hardness of a hard coat. The laminated resin sheet for molding of the present invention is not easily damaged and has high chemical resistance since a hard coat anti-glare layer that is hard is provided on the surface layer. Utilizing these characteristics, the laminated resin sheet for molding of the present invention can be used for component parts of display surfaces of personal computers, mobile phones and the like; exterior and interior members of automobiles; cases and front plates having a curved surface in mobile phone terminals, personal computers, tablet PCs, car navigation systems and the like, etc.

Hereinafter, respective components of the resin sheet according to the present invention will be described.

<Base Material Layer>

The base material layer contains a polycarbonate resin (a1). The base material layer may further contain another resin, an additive, etc.

(Polycarbonate Resin (a1))

The polycarbonate resin (a1) is not particularly limited as long as it contains a carbonate bond, i.e., a —[O—R—OCO]— unit (wherein R may include an aliphatic group, an aromatic group, or both of the aliphatic group and the aromatic group, and it may have a linear structure or a branched structure) in the main chain of the molecule. However, it is preferably an aromatic polycarbonate resin, and it is particularly preferred to use a polycarbonate resin containing a structural unit of formula (3a) below.

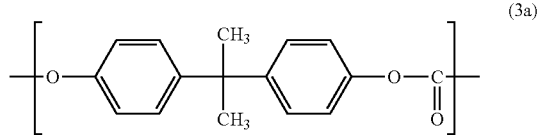

(3a)

Specifically, as the polycarbonate resin (a1), an aromatic polycarbonate resin (e.g., Iupilon S-2000, Iupilon S-1000 and Iupilon E-2000; manufactured by Mitsubishi Engineering-Plastics Corporation), etc. can be used.

By using such a polycarbonate resin, a resin sheet having more excellent impact resistance can be obtained.

Recently, for the purpose of controlling the glass transition point of a polycarbonate resin, a polycarbonate resin to which a monovalent phenol represented by general formula (3) below as an end terminator is added is used. Similarly, in the present invention, a polycarbonate resin to which an end terminator is added can be used.

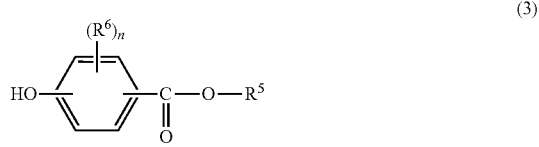

(3)

In the formula, $R^5$ represents a $C_{8-36}$ alkyl group or a $C_{8-36}$ alkenyl group; $R^6$ each independently represent a hydrogen atom, a halogen atom, a $C_{1-20}$ alkyl group which may have a substituent, or a $C_{6-12}$ aryl group; n is an integer of 0 to 4; and in this regard, the substituent is halogen, a $C_{1-20}$ alkyl group, or a $C_{6-12}$ aryl group. In this specification, the "alkyl group" and the "alkenyl group" may be linear or branched, and may have a substituent.

The monovalent phenol represented by general formula (3) is preferably one represented by general formula (4) below.

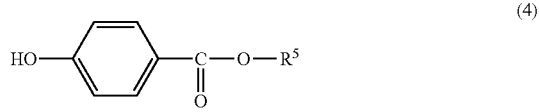

(4)

In the formula, $R^5$ represents a $C_{8-36}$ alkyl group or a $C_{8-36}$ alkenyl group.

The carbon number of $R^5$ in general formula (3) or general formula (4) is more preferably within a specific numerical range. Specifically, the upper limit of the carbon number of $R^5$ is preferably 36, more preferably 22, and particularly preferably 18. Further, the lower limit of the carbon number of $R^5$ is preferably 8, and more preferably 12.

When the upper limit of the carbon number of $R^5$ in general formula (3) or general formula (4) is suitable, it is preferred because the organic solvent solubility of the monovalent phenol (end terminator) tends to be higher; and the productivity at the time of the production of the polycarbonate resin is higher.

For example, when the carbon number of $R^5$ is 36 or less, the productivity at the time of the production of the polycarbonate resin is high; and economic efficiency is satisfactory. When the carbon number of $R^5$ is 22 or less, the monovalent phenol is particularly excellent in organic solvent solubility, the productivity at the time of the production of the polycarbonate resin is very high, and economic efficiency is improved. Examples of polycarbonate resins in which such a monovalent phenol is used include Iupizeta T-1380 (manufactured by Mitsubishi Gas Chemical Company, Inc.).

When the lower limit of the carbon number of $R^5$ in general formula (3) or general formula (4) is suitable, it is preferred because the glass transition point of the polycarbonate resin is not too high and preferable thermoformability is obtained.

For example, when using a monovalent phenol represented by general formula (4), wherein $R^5$ is a $C_{16}$ alkyl group, as the end terminator, it is possible to obtain a polycarbonate resin excellent in the glass transition temperature, melt flowability, moldability, drawdown resistance, etc., and it is particularly preferred because the solvent solubility of the monovalent phenol at the time of the production of the polycarbonate resin is also excellent.

Among monovalent phenols represented by general formula (3) or general formula (4), it is particularly preferred to use one or both of p-hydroxybenzoic acid hexadecyl ester and p-hydroxybenzoic acid 2-hexyldecyl ester as the end terminator.

The weight average molecular weight of the polycarbonate resin (a1) is preferably 15,000 to 75,000, more preferably 20,000 to 70,000, and even more preferably 20,000 to 65,000. When the weight average molecular weight of the polycarbonate resin (a1) is 15,000 or more, it is preferred because high impact resistance may be obtained. Meanwhile, when the weight average molecular weight is 75,000 or less, it is preferred because the base material layer can be formed with a small heat source; and thermal stability can be maintained even under high-temperature molding conditions. In this specification, the weight average molecular weight is a standard polystyrene equivalent weight average molecular weight measured by gel permeation chromatography (GPC).

Tg of the polycarbonate resin (a1) is preferably 90 to 190° C., more preferably 100 to 170° C., and even more preferably 110 to 150° C. Note that Tg of the polycarbonate resin (a1) can be controlled by suitably adjusting the types of structural units of the polycarbonate resin (a1) and the combination thereof, the weight average molecular weight, etc. Further, in this specification, the glass transition point is a temperature obtained by carrying out the measurement using a differential scanning calorimeter and 10 mg of a sample at a temperature raising rate of 10° C./min and calculation according to a midpoint method.

The polycarbonate resin (a1) contained in the base material layer may consist of one material or two or more materials.

The content of the polycarbonate resin (a1) in the base material layer is preferably 75 to 100% by mass, more preferably 90 to 100% by mass, and particularly preferably 100% by mass relative to the total mass of the base material layer. When the content of the polycarbonate resin is 75% or more, it is preferred because impact resistance can be further improved in this case.

(Another Resin)

The another resin is not particularly limited, and examples thereof include a polyester resin.

It is preferred that the polyester resin mainly contains terephthalic acid as a dicarboxylic acid component, and a dicarboxylic acid component other than terephthalic acid may also be contained in the polyester resin.

For example, a polyester resin obtained by polycondensation of a glycol component containing 80 to 60 mol % of ethylene glycol that is the main component and 20 to 40 mol % of 1,4-cyclohexanedimethanol (100 mol % in total) (so-called "PETG") is preferred.

Note that as said another resin, one material may be used solely, or two or more materials may be used in combination.

When another resin is contained, the content thereof is preferably 0 to 50% by mass, more preferably 0 to 30% by mass, and particularly preferably 0 to 20% by mass relative to the total mass of the base material layer.

(Additive)

As the additive, those usually used for resin sheets can be used. Specific examples thereof include an antioxidant, an anti-coloring agent, an antistatic agent, a mold release agent, a lubricant, a dye, a pigment, a plasticizer, a flame retardant, a resin modifier, a compatibilizer, and a reinforcing material such as an organic filler and an inorganic filler. These additives may be used solely, or two or more of them may be used in combination.

The amount of the additive is preferably 0 to 10% by mass, more preferably 0 to 7% by mass, and particularly preferably 0 to 5% by mass relative to the total mass of the base material layer.

The method for mixing the additive and the resin is not particularly limited, and it is possible to use a method of compounding the total amount, a method of dry-blending a master batch, a method of dry-blending the total amount or the like.

(Base Material Layer)

The thickness of the base material layer is preferably 0.3 to 10 mm, more preferably 0.3 to 5 mm, and even more preferably 0.3 to 3.5 mm.

<High Hardness Resin Layer>

The high hardness resin layer contains a high hardness resin. In addition, another resin, an additive, etc. may be further contained therein according to need. In this specification, the high hardness resin means a resin having hardness higher than that of the polycarbonate resin serving as the base material and having a pencil hardness of HB or harder, preferably HB to 3H, more preferably H to 3H, and even more preferably 2H to 3H. Note that the pencil hardness of the high hardness resin layer is a result obtained by evaluation by the pencil scratch hardness test in accordance with JIS K 5600-5-4:1999. Specifically, the highest hardness of the pencil, with which the surface of the hard coat anti-glare layer is not damaged when the pencil is pressed against the surface at an angle of 45° with respect to the surface with a load of 750 g, while increasing the hardness thereof, is evaluated as the pencil hardness.

[High Hardness Resin]

The high hardness resin is not particularly limited, but preferably comprises at least one selected from the group consisting of Resin (B1) to Resin (B6).

(Resin (B1))

Resin (B1) is a copolymer containing a (meth)acrylic acid ester structural unit (a) represented by general formula (1) and an aliphatic vinyl structural unit (b) represented by general formula (2). In this regard, the aforementioned Resin (B1) may further have another structural unit. In this specification, (meth)acrylic indicates methacrylic and/or acrylic.

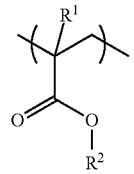

(1)

In the formula, $R^1$ is a hydrogen atom or a methyl group, and preferably a methyl group.

Further, $R^2$ is a $C_{1-18}$ alkyl group, preferably a $C_{1-10}$ alkyl group, and more preferably a $C_{1-6}$ alkyl group. Specific examples thereof include a methyl group, an ethyl group, a butyl group, a lauryl group, a stearyl group, a cyclohexyl group, and an isobornyl group. Among them, $R^2$ is preferably a methyl group or an ethyl group, and more preferably a methyl group.

In the case where $R^2$ is a methyl group or an ethyl group, the (meth)acrylic acid ester structural unit (a) represented by general formula (1) is a (meth)acrylic acid ester structural unit, and in the case where $R^1$ is a methyl group and $R^2$ is a methyl group, the (meth)acrylic acid ester structural unit (a) represented by general formula (1) is a methyl methacrylate structural unit.

As the (meth)acrylic acid ester structural unit (a) represented by general formula (1), only one material may be contained in Resin (B1), or two or more materials may be contained in Resin (B1).

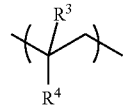

(2)

In the formula, $R^3$ is a hydrogen atom or a methyl group, and preferably a hydrogen atom.

$R^4$ is a cyclohexyl group which may be substituted with a $C_{1-4}$ hydrocarbon group, and preferably a cyclohexyl group not having a substituent.

In the case where $R^3$ is a hydrogen atom and $R^4$ is a cyclohexyl group, the aliphatic vinyl structural unit (b) represented by general formula (2) is a vinylcyclohexane structural unit.

As the aliphatic vinyl structural unit (b) represented by general formula (2), only one material may be contained in Resin (B1), or two or more materials may be contained in Resin (B1).

In this specification, the "hydrocarbon group" may be linear, branched, or cyclic and may have a substituent.

The aforementioned another structural unit is not particularly limited, and examples thereof include a structural unit derived from an aromatic vinyl monomer including a non-hydrogenated aromatic double bond, which is generated in the process of the production of Resin (B1), wherein: a (meth)acrylic acid ester monomer and an aromatic vinyl monomer are polymerized; and then an aromatic double bond derived from the aromatic vinyl monomer is hydrogenated. Specific examples of said another structural unit include a styrene structural unit.

As said another structural unit, only one material may be contained in Resin (B1), or two or more materials may be contained in Resin (B1).

The total content of the (meth)acrylic acid ester structural unit (a) and the aliphatic vinyl structural unit (b) is preferably 90 to 100 mol %, more preferably 95 to 100 mol %, and particularly preferably 98 to 100 mol % relative to all the structural units in Resin (B1).

The content of the (meth)acrylic acid ester structural unit (a) represented by general formula (1) is preferably 65 to 80 mol %, and more preferably 70 to 80 mol % relative to all the structural units in Resin (B1). When the ratio of the (meth)acrylic acid ester structural unit (a) is 65 mol % or more, it is preferred because in this case, it is possible to obtain a resin layer excellent in adhesion to the base material layer and surface hardness. Meanwhile, when the ratio of the (meth)acrylic acid ester structural unit (a) is 80 mol % or less, it is preferred because in this case, warpage caused by water absorption of the resin sheet does not easily occur.

The content of the aliphatic vinyl structural unit (b) represented by general formula (2) is preferably 20 to 35 mol %, and more preferably 20 to 30 mol % relative to all the structural units in Resin (B1). When the content of the aliphatic vinyl structural unit (b) is 20 mol % or more, it is preferred because in this case, warpage under high-temperature and high-humidity conditions can be prevented. Meanwhile, when the content of the aliphatic vinyl structural unit (b) is 35 mol % or less, it is preferred because in this case, detachment from the base material at the interface can be prevented.

Further, the content of said another structural unit is preferably 10 mol % or less, more preferably 5 mol % or less, and particularly preferably 2 mol % or less relative to all the structural units in Resin (B1).

In this specification, the "copolymer" may have a structure of either a random copolymer, block copolymer, or alternating copolymer.

The weight average molecular weight of Resin (B1) is not particularly limited, but it is preferably 50,000 to 400,000, and more preferably 70,000 to 300,000 from the viewpoint of strength and moldability.

The glass transition point of Resin (B1) is preferably 110 to 140° C., more preferably 110 to 135° C., and particularly preferably 110 to 130° C. When the glass transition point is 110° C. or higher, it is preferred because in this case, deformation and cracking of the resin sheet rarely occur under a heat environment or wet heat environment. Meanwhile, when the glass transition point is 140° C. or lower, it is preferred because in this case, excellent processability is obtained when molding is performed by means of continuous type thermal shaping using a mirror surface roll or shaping roll or batch type thermal shaping using a mirror surface mold or shaping mold.

Specific examples of Resin (B1) include Optimas 7500 and 6000 (manufactured by Mitsubishi Gas Chemical Company, Inc.). Note that as the above-described Resin (B1), one material may be used solely, or two or more materials may be used in combination.

When using Resin (B1) as the high hardness resin, Iupizeta T-1380 (manufactured by Mitsubishi Gas Chemical Company, Inc.) is preferably used as the polycarbonate resin (a1).

Further, it is particularly preferred to employ an embodiment in which: Resin (B1), which is a copolymer that contains 75 mol % of a structural unit represented by general formula (1) (both $R^1$ and $R^2$ are a methyl group; methyl methacrylate) and 25 mol % of a structural unit represented by general formula (2) ($R^3$ is a hydrogen atom, and $R^4$ is a cyclohexyl group; vinylcyclohexane), is used as the high hardness resin; a polycarbonate resin containing a structural unit represented by general formula (3a) is used as the polycarbonate resin (a1); and a monovalent phenol represented by general formula (4) (the carbon number of $R^5$ is 8 to 22) is used as the end terminator.

The method for producing Resin (B1) is not particularly limited, but it is preferably obtained by polymerizing at least one (meth)acrylic acid ester monomer and at least one aromatic vinyl monomer, followed by hydrogenating an aromatic double bond derived from the aromatic vinyl monomer.

The aforementioned aromatic vinyl monomer is not particularly limited, and examples thereof include styrene, α-methylstyrene, p-hydroxystyrene, alkoxystyrene, chlorostyrene, and derivatives thereof. Among them, styrene is preferred as the aromatic vinyl monomer.

For polymerizing the (meth)acrylic acid ester monomer and the aromatic vinyl monomer, a publicly-known method can be used, and for example, the production can be carried out according to a bulk polymerization method, a solution polymerization method, or the like.

The bulk polymerization method is carried out, for example, by a method of continuously supplying a monomer composition containing the above-described monomers and a polymerization initiator to a complete mixing tank to perform continuous polymerization at 100 to 180° C. The above-described monomer composition may contain a chain transfer agent according to need.

The polymerization initiator is not particularly limited, and examples thereof include organic peroxides such as t-amyl peroxy-2-ethylhexanoate, t-butyl peroxy ethylhexanoate, benzoyl peroxide, 1,1-di(t-hexylperoxy)-3,3,5-trimethylcyclohexane, 1,1-di(t-hexylperoxy)cyclohexane, 1,1-di(t-butylperoxy)cyclo hexane, t-hexyl propoxyisopropyl monocarbonate, t-amyl peroxy-n-octoate, t-butyl peroxyisopropyl monocarbonate, and di-t-butyl peroxide; and azo compounds such as 2,2'-azobisisobutyronitrile, 2,2'-azobis(2-methylbutyronitrile) and 2,2'-azobis(2,4-dimethylvaleronitrile). These substances may be used solely, or two or more of them may be used in combination.

The chain transfer agent is not particularly limited, and examples thereof include α-methylstyrene dimer.

Examples of the solvent to be used in the solution polymerization method include hydrocarbon-based solvents such as toluene, xylene, cyclohexane, and methylcyclohexane; ester-based solvents such as ethyl acetate and methyl isobutyrate; ketone-based solvents such as acetone and methyl ethyl ketone; ether-based solvents such as tetrahydrofuran and dioxane; and alcohol-based solvents such as methanol and isopropanol. These solvents may be used solely, or two or more of them may be used in combination.

The solvent to be used in the hydrogenation reaction, in which an aromatic double bond derived from the aromatic vinyl monomer is hydrogenated, after the polymerization of the (meth)acrylic acid ester monomer and the aromatic vinyl monomer may be the same as or different from the above-described polymerization solvent. Examples thereof include hydrocarbon-based solvents such as cyclohexane and methylcyclohexane, ester-based solvents such as ethyl acetate and methyl isobutyrate, ketone-based solvents such as acetone and methyl ethyl ketone, ether-based solvents such as tetrahydrofuran and dioxane, and alcohol-based solvents such as methanol and isopropanol.

The method for hydrogenation is not particularly limited, and a publicly-known method can be used. For example, hydrogenation can be performed at a hydrogen pressure of 3 to 30 MPa and a reaction temperature of 60 to 250° C. by means of a batch type or continuous flow-type reaction. When the reaction temperature is 60° C. or higher, it is preferred because the reaction time is not too long in this case. Meanwhile, when the reaction temperature is 250° C. or lower, it is preferred because a side reaction such as cut of a molecular chain and hydrogenation of an ester moiety is not caused or hardly caused in this case.

Examples of the catalyst to be used in the hydrogenation reaction include a solid catalyst in which a metal such as nickel, palladium, platinum, cobalt, ruthenium, and rhodium; or an oxide, salt, or complex of the metal is carried by a porous carrier such as carbon, alumina, silica, silica-alumina, and diatomaceous earth.

By the hydrogenation reaction, 70% or more of the aromatic double bond derived from the aromatic vinyl monomer is preferably hydrogenated. In other words, the nonhydrogenation rate of the aromatic double bond included in the structural unit derived from the aromatic vinyl monomer is preferably less than 30%, more preferably less than 10%, and even more preferably less than 5%. When the nonhydrogenation rate of is less than 30%, it is preferred because a resin having excellent transparency can be obtained in this case. Note that the structural unit of the nonhydrogenated portion may serve as said another structural unit in Resin (B1).

(Resin (B2))

Resin (B2) is a copolymer containing 6 to 77% by mass of a (meth)acrylic acid ester structural unit, 15 to 71% by mass of a styrene structural unit, and 8 to 23% by mass of an unsaturated dicarboxylic acid structural unit. In this regard, the aforementioned Resin (B2) may further have another structural unit.

The (meth)acrylic acid ester monomer constituting the (meth)acrylic acid ester structural unit in Resin (B2) is not particularly limited, and examples thereof include acrylic acid, methyl acrylate, ethyl acrylate, n-butyl acrylate, 2ethylhexyl acrylate, methacrylic acid, methyl methacrylate, ethyl methacrylate, n-butyl methacrylate, and 2ethylhexyl methacrylate. Among them, the (meth)acrylic acid ester monomer is preferably methyl methacrylate. The above-described (meth)acrylic acid ester monomers may be contained solely as the (meth)acrylic acid ester structural unit, or two or more of them may be contained as a mixture.

The content of the (meth)acrylic acid ester structural unit is 6 to 77% by mass, and preferably 20 to 70% by mass relative to the total mass of Resin (B2).

The styrene structural unit in Resin (B2) is not particularly limited, and any publicly-known styrene-based monomer can be used. From the viewpoint of availability, examples of the styrene monomer include styrene, α-methylstyrene, o-methylstyrene, m-methylstyrene, p-methylstyrene, and t-butylstyrene. Among them, from the viewpoint of compatibility, the styrene monomer is preferably styrene. The above-described styrene monomers may be contained solely as the styrene structural unit, or two or more of them may be contained as a mixture.

The content of the styrene structural unit is 15 to 71% by mass, and preferably 20 to 66% by mass relative to the total mass of Resin (B2).

The unsaturated dicarboxylic acid anhydride monomer constituting the unsaturated dicarboxylic acid structural unit in Resin (B2) is not particularly limited, and examples thereof include acid anhydrides of maleic acid, itaconic acid, citraconic acid, aconitic acid, etc. Among them, from the viewpoint of compatibility with the styrene-based monomer, the unsaturated dicarboxylic acid anhydride monomer is preferably maleic anhydride. The above-described unsaturated dicarboxylic acid anhydride monomers may be contained solely as the unsaturated dicarboxylic acid structural unit, or two or more of them may be contained as a mixture.

The content of the unsaturated dicarboxylic acid structural unit is 8 to 23% by mass, and preferably 10 to 23% by mass relative to the total mass of Resin (B2).

Examples of said another structural unit in Resin (B2) include N-phenylmaleimide.

The content of said another structural unit is preferably 10 mol % or less, more preferably 5 mol % or less, and particularly preferably 2 mol % or less relative to all the structural units in Resin (B2).

The total content of the (meth)acrylic acid ester structural unit, the styrene structural unit and the unsaturated dicarboxylic acid structural unit is preferably 90 to 100 mol %, more preferably 95 to 100 mol %, and particularly preferably 98 to 100 mol % relative to all the structural units in Resin (B2).

The weight average molecular weight of Resin (B2) is not particularly limited, but it is preferably 50,000 to 300,000, and more preferably 80,000 to 200,000.

The glass transition point of Resin (B2) is preferably 90 to 150° C., more preferably 100 to 150° C., and particularly preferably 115 to 150° C.

Specific examples of Resin (B2) include RESISFY R100, R200, and R310 (manufactured by Denka), DELPET 980N (manufactured by Asahi Kasei Corporation) and hw55 (manufactured by Daicel-Evonik Ltd.). Note that as the above-described Resin (B2), one material may be used solely, or two or more materials may be used in combination.

When using Resin (B2) as the high hardness resin, it is preferred to employ an embodiment in which a polycarbonate resin containing a structural unit represented by general formula (3a) is used as the polycarbonate resin (a1). In addition, it is particularly preferred to employ an embodiment in which a monovalent phenol represented by general formula (4) (the carbon number of $R^1$ is 8 to 22) is used as the end terminator. Examples of such polycarbonate resins include lupizeta T-1380 (manufactured by Mitsubishi Gas Chemical Company, Inc.) and lupilon E-2000 (manufactured by Mitsubishi Engineering-Plastics Corporation).

When using, as the high hardness resin, Resin (B2) that is a copolymer consisting of 6 to 26% by mass of a methyl methacrylate structural unit, 55 to 21% by mass of a styrene structural unit, and 15 to 23% by mass of a maleic anhydride structural unit (R100, R200, or R310; manufactured by Denka), it is preferred to employ an embodiment in which lupizeta T-1380 is used as the polycarbonate resin (a1).

Further, when using, as the high hardness resin, Resin (B2) that is a copolymer consisting of 6% by mass of a methyl methacrylate structural unit, 71% of styrene and 23% of maleic anhydride (R310; manufactured by Denka), it is particularly preferred to employ an embodiment in which lupizeta T-1380 is used as the polycarbonate resin (a1).

The method for producing Resin (B2) is not particularly limited, and examples thereof include a bulk polymerization method and a solution polymerization method.
(Resin (B3))

Resin (B3) is a polymer containing a structural unit (c) represented by general formula (5). In this regard, it is preferred that the polymer further contains a structural unit (d) represented by general formula (6). Further, the polymer may further contain another structural unit.

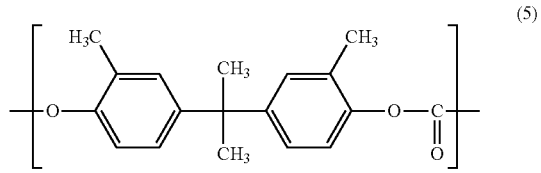

The content of the structural unit (c) represented by general formula (5) is preferably 50 to 100 mol %, more preferably 60 to 100 mol %, and particularly preferably 70 to 100 mol % relative to all the structural units in Resin (B3).

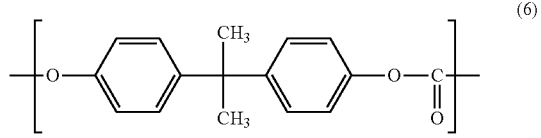

The content of the structural unit (d) represented by general formula (6) is preferably 0 to 50 mol %, more preferably 0 to 40 mol %, and particularly preferably 0 to 30 mol % relative to all the structural units in Resin (B3).

The content of said another structural unit is preferably 10 mol % or less, more preferably 5 mol % or less, and particularly preferably 2 mol % or less relative to all the structural units in Resin (B3).

The total content of the structural unit (c) and the structural unit (d) is preferably 90 to 100 mol %, more preferably 95 to 100 mol %, and even more preferably 98 to 100 mol % relative to all the structural units in Resin (B3).

The weight average molecular weight of Resin (B3) is preferably 15,000 to 75,000, more preferably 20,000 to 70,000, and particularly preferably 25,000 to 65,000.

The glass transition point of Resin (B3) is preferably 105 to 150° C., more preferably 110 to 140° C., and particularly preferably 110 to 135° C.

Specific examples of Resin (B3) include Iupilon KH341OUR, KH352OUR, and KS341OUR (manufactured by Mitsubishi Engineering-Plastics Corporation). Note that as the above-described Resin (B3), one material may be used solely, or two or more materials may be used in combination.

When using Resin (B3) as the high hardness resin, it is preferred to employ an embodiment in which a polycarbonate resin containing a structural unit represented by general formula (3a) is used as the polycarbonate resin (a1). In addition, it is particularly preferred to employ an embodiment in which a monovalent phenol represented by general formula (4) (the carbon number of $R^5$ is 8 to 22) is used as the end terminator. Examples of such polycarbonate resins include Iupizeta T-1380 (manufactured by Mitsubishi Gas Chemical Company, Inc.). It is particularly preferred to use Iupilon KS341OUR (manufactured by Mitsubishi Engineering-Plastics Corporation) as Resin (B3), and Iupizeta T-1380 (manufactured by Mitsubishi Gas Chemical Company, Inc.) as the polycarbonate resin (a1).

When using Resin (B3) as the high hardness resin, it is preferred that another resin other than Resin (B1) to Resin (B6) is contained. In this regard, as said another resin other than Resin (B1) to Resin (B6), a resin that does not contain the structural unit (c) and contains the structural unit (d) is preferred, and a resin consisting of only the structural unit (d) is more preferred. Specifically, an aromatic polycarbonate resin (e.g., Iupilon S-2000, Iupilon S-1000, and Iupilon E-2000; manufactured by Mitsubishi Engineering-Plastics Corporation), etc. can be used.

When said another resin other than Resin (B1) to Resin (B6) is contained, the ratio of Resin (B3) is preferably 45% by mass of more, and more preferably 55% by mass or more relative to all resins contained in the high hardness resin layer.

The method for producing Resin (B3) is not particularly limited, but it can be produced by a method similar to the above-described method for producing the polycarbonate resin (a1), except that bisphenol C is used as a monomer.
(Resin (B4))

Resin (B4) is a copolymer containing 5 to 20% by mass of a styrene structural unit, 60 to 90% by mass of a (meth)acrylic acid ester structural unit, and 5 to 20% by mass of an N-substituted maleimide structural unit. Note that the aforementioned Resin (B4) may further contain another structural unit.

The styrene structural unit in Resin (B4) is not particularly limited, and any publicly-known styrene-based monomer can be used. From the viewpoint of availability, examples of the aforementioned styrene monomer include styrene, α-methylstyrene, o-methylstyrene, m-methylstyrene, p-methylstyrene, and t-butylstyrene. Among them, from the viewpoint of compatibility, the styrene monomer is preferably styrene. As the styrene structural unit, the above-described styrene monomers may be contained solely, or two or more of them may be contained as a mixture.

The content of the styrene structural unit is 5 to 20% by mass, preferably 5 to 15% by mass, and more preferably 5 to 10% by mass relative to the total mass of Resin (B4).

The (meth)acrylic acid ester monomer constituting the (meth)acrylic acid ester structural unit in Resin (B4) is not particularly limited, and examples thereof include acrylic acid, methyl acrylate, ethyl acrylate, n-butyl acrylate, 2ethylhexyl acrylate, methacrylic acid, methyl methacrylate, ethyl methacrylate, n-butyl methacrylate, and 2ethylhexyl methacrylate. Among them, the (meth)acrylic acid ester monomer is preferably methyl methacrylate. As the (meth) acrylic acid ester structural unit, the above-described (meth) acrylic acid ester monomers may be contained solely, or two or more of them may be contained as a mixture.

The content of the (meth)acrylic acid ester structural unit is 60 to 90% by mass, preferably 70 to 90% by mass, and more preferably 80 to 90% by mass relative to the total mass of Resin (B4).

Examples of the N-substituted maleimide structural unit in Resin (B4) include structural units derived from N-arylmaleimide such as N-phenylmaleimide, N-chlorophenylmaleimide, N-methylphenylmaleimide, N-naphthylmaleimide, N-hydroxyphenylmaleimide, N-methoxyphenylmaleimide, N-carboxyphenylmaleimide, N-nitrophenylmaleimide and N-tribromophenylmaleimide, or the like. Among them, from the viewpoint of compatibility with the acrylic resin, a structural unit derived from N-phenylmaleimide is preferred. As the N-substituted maleimide structural unit, the above-described structural units derived from N-substituted maleimide may be contained solely, or two or more of them may be contained as a mixture.

The content of the N-substituted maleimide structural unit is 5 to 20% by mass, preferably 5 to 15% by mass, and more preferably 5 to 10% by mass relative to the total mass of Resin (B4).

Examples of said another structural unit include a (meth) acrylic acid ester structural unit represented by general formula (1) and an aliphatic vinyl structural unit represented by general formula (2). In this regard, the aforementioned general formula (1) and general formula (2) are the same as those with respect to Resin (B1).

The content of said another structural unit is preferably 10 mol % or less, more preferably 5 mol % or less, and particularly preferably 2 mol % or less relative to all the structural units in Resin (B4).

The total content of the styrene structural unit, the (meth) acrylic acid ester structural unit and the N-substituted maleimide structural unit is preferably 90 to 100 mol %, more preferably 95 to 100 mol %, and even more preferably 98 to 100 mol % relative to all the structural units in Resin (B4).

The weight average molecular weight of Resin (B4) is preferably 50,000 to 250,000, and more preferably 100,000 to 200,000.

The glass transition point of Resin (B4) is preferably 110 to 150° C., more preferably 115 to 140° C., and particularly preferably 115 to 135° C.

Specific examples of Resin (B4) include DELPET PM120N (manufactured by Asahi Kasei Corporation). As the above-described Resin (B4), one material may be used solely, or two or more materials may be used in combination.

When using Resin (B4) as the high hardness resin, it is preferred to employ an embodiment in which a polycarbonate resin containing a structural unit represented by general formula (4a) is used as the polycarbonate resin (a1). In addition, it is particularly preferred to employ an embodiment in which a monovalent phenol represented by general formula (5) (the carbon number of R1 is 8 to 22) is used as the end terminator. Examples of such polycarbonate resins include Iupizeta T-1380 (manufactured by Mitsubishi Gas Chemical Company, Inc.). It is particularly preferred to use DELPET PM-120N that consists of 7% of a styrene structural unit, 86% of a (meth)acrylic acid ester structural unit, and 7% of a N-substituted maleimide structural unit as Resin (B4) and Iupizeta T-1380 as the polycarbonate resin (a1).

The method for producing Resin (B4) is not particularly limited, and it can be produced by means of solution polymerization, bulk polymerization, or the like.

(Resin (B5))

Resin (B5) is a polymer containing a structural unit (e) represented by general formula (7). In this regard, Resin (B5) may further contain another structural unit.

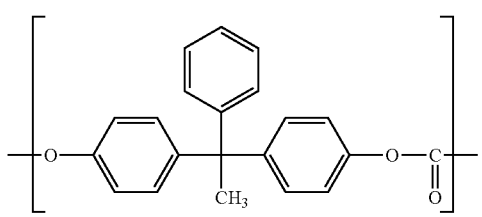

(7)

The content of the structural unit (e) represented by general formula (7) is preferably 80 to 100 mol %, more preferably 90 to 100 mol %, and particularly preferably 95 to 100 mol % relative to all the structural units in Resin (B5).

Examples of said another structural unit include a structural unit represented by general formula (5) and a structural unit represented by general formula (6). In this regard, the aforementioned general formula (5) and general formula (6) are the same as those with respect to Resin (B3).

The content of said another structural unit is preferably 10 mol % or less, more preferably 5 mol % or less, and particularly preferably 2 mol % or less relative to all the structural units in Resin (B5).

The weight average molecular weight of Resin (B5) is preferably 10,000 to 1,000,000, and more preferably 15,000 to 50,000.

The glass transition point of Resin (B5) is preferably 120 to 200° C., more preferably 130 to 190° C., and particularly preferably 140 to 190° C.

Specific examples of Resin (B5) include Iupizeta FPCO220 (manufactured by Mitsubishi Gas Chemical Company, Inc.). As the above-described Resin (B5), one material may be used solely, or two or more materials may be used in combination.

When using Resin (B5) as the high hardness resin, it is preferred to employ an embodiment in which a polycarbonate resin containing a structural unit represented by general formula (3a) is used as the polycarbonate resin (a1). Examples of such polycarbonate resins include Iupilon E-2000 (manufactured by Mitsubishi Engineering-Plastics Corporation). It is particularly preferred to use Iupizeta FPCO220 (manufactured by Mitsubishi Gas Chemical Company, Inc.) as Resin (B5) and Iupilon E-2000 (manufactured by Mitsubishi Engineering-Plastics Corporation) as the polycarbonate resin (a1).

When using Resin (B5) as the high hardness resin, it is preferred that another resin other than Resin (B1) to Resin (B6) is contained. In this regard, as said another resin other than Resin (B1) to Resin (B6), a resin that does not contain the structural unit (c) and contains the structural unit (d) is preferred, and a resin consisting of the structural unit (d) is more preferred. Specifically, an aromatic polycarbonate resin (e.g., Iupilon S-2000, Iupilon S-1000, and Iupilon E-2000; manufactured by Mitsubishi Engineering-Plastics Corporation), etc. can be used.

When said another resin other than Resin (B1) to Resin (B6) is contained, the ratio of Resin (B5) is preferably 45% by mass of more, and more preferably 55% by mass or more relative to all resins contained in the high hardness resin layer.

The method for producing Resin (B5) is not particularly limited, but it can be produced by a method similar to the above-described method for producing the polycarbonate resin (a1), except that bisphenol AP is used as a monomer.

(Resin (B6))

Resin (B6) is a copolymer containing 50 to 95% by mass of a styrene structural unit and 5 to 50% by mass of an unsaturated dicarboxylic acid structural unit.

As the styrene structural unit, the styrene-based monomer described with respect to Resin (B4) can be used. For Resin (B6), these styrene structural units may be used solely, or two or more of them may be used in combination.

The content of the styrene structural unit is preferably 50 to 95% by mass, more preferably 60 to 90% by mass, and even more preferably 65 to 87% by mass relative to the total mass of Resin (B6).

Examples of the unsaturated dicarboxylic acid anhydride monomer constituting the unsaturated dicarboxylic acid structural unit include acid anhydrides of maleic acid, itaconic acid, citraconic acid, aconitic acid, etc. Among them, from the viewpoint of compatibility with the styrene-based monomer, maleic anhydride is preferred. Note that the above-described unsaturated dicarboxylic acid anhydride monomers may be used solely, or two or more of them may be used in combination.

The content of the unsaturated dicarboxylic acid structural unit is preferably 5 to 50% by mass, more preferably 10 to 40% by mass, and even more preferably 13 to 35% by mass relative to the total mass of Resin (B6).

Resin (B6) may contain another structural unit other than the above-described structural units. Examples of said another structural unit include a structural unit derived from general formula (1) below and a structural unit derived from general formula (2) below.

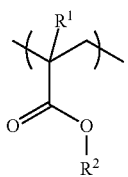

(1)

In the formula, $R^1$ and $R^2$ are the same as those described above.

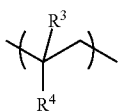

(2)

In the formula, $R^3$ and $R^4$ are the same as those described above.

The content of said another structural unit is preferably 10 mol % or less, more preferably 5 mol % or less, and even more preferably 2 mol % or less relative to all the structural units in Resin (B6).

The weight average molecular weight of Resin (B6) is preferably 50,000 to 250,000, and more preferably 100,000 to 200,000.

The glass transition point of Resin (B6) is preferably 110 to 150° C., more preferably 115 to 140° C., and particularly preferably 115 to 137° C.

Specific examples of Resin (B6) include XIBOND140 and XIBOND160 (manufactured by Polyscope). Note that as the above-described Resin (B6), one material may be used solely, or two or more materials may be used in combination.

When using Resin (B6) as the high hardness resin, it is preferred to employ an embodiment in which a polycarbonate resin containing a structural unit represented by general formula (3a) is used as the polycarbonate resin (a1). In addition, it is particularly preferred to employ an embodiment in which a monovalent phenol represented by general formula (4) (the carbon number of $R^1$ is 8 to 22) is used as the end terminator. Examples of such polycarbonate resins include Iupizeta T-1380 (manufactured by Mitsubishi Gas Chemical Company, Inc.). It is particularly preferred to use an alloy of XIBOND160 consisting of 78% by mass of a styrene structural unit and 22% by mass of a maleic anhydride structural unit and an acrylic resin as Resin (B6), and Iupizeta T-1380 as the polycarbonate resin (a1).

The method for producing Resin (B6) is not particularly limited, and it can be produced by means of solution polymerization, bulk polymerization or the like.

At least one selected from the group consisting of the above-described Resin (B1) to Resin (B6) may be contained as an alloy.

The aforementioned alloy is not particularly limited, and examples thereof include an alloy of two materials that are Resin (B1), an alloy of two materials that are Resin (B2), an alloy of two materials that are Resin (B3), an alloy of two materials that are Resin (B4), an alloy of two materials that are Resin (B5), an alloy of two materials that are Resin (B6), an alloy of Resin (B1) and Resin (B2), an alloy of Resin (B2) and Resin (B4), an alloy of Resin (B2) and another high hardness resin, an alloy of Resin (B2) and an acrylic resin, and an alloy of Resin (B6) and an acrylic resin.

Examples of the aforementioned another high hardness resin include a methyl methacrylate-styrene copolymer and an acrylonitrile-butadiene-styrene copolymer.

Examples of the acrylic resin include polymethyl methacrylate, and a copolymer of methyl methacrylate and methyl acrylate or ethyl acrylate. Examples of commercially-available products include ACRYPET (manufactured by Mitsubishi Chemical Corporation), SUMIPEX (manufactured by Sumitomo Chemical Co., Ltd.), and PARAPET (manufactured by Kuraray Co., Ltd.).

When an alloy of two resins is employed, an alloy of resins having higher glass transition temperatures is preferred.

Note that the above-described alloys may be used solely, or two or more of them may be used in combination.

The method for producing an alloy is not particularly limited, and examples thereof include a method in which melt-kneading is performed using a twin screw extruder having a screw diameter of 26 mm and at a cylinder temperature of 240° C. and a mixture is extruded into a strand-like shape and pelletized using a pelletizer.

The high hardness resin contained in the high hardness resin layer may consist of one material or two or more materials. When selecting two or more materials from Resin (B1) to Resin (B6), such materials can be selected from the same category or different categories. Further, a high hardness resin other than Resin (B1) to Resin (B6) may be contained.

The content of the high hardness resin in the high hardness resin layer is preferably 70 to 100% by mass, more preferably 80 to 100% by mass, and particularly preferably 100% by mass relative to the total mass of the high hardness resin layer.

[Another Resin]

The high hardness resin layer may contain another resin in addition to the high hardness resin. Examples of said another resin include a methyl methacrylate-styrene copolymer, polymethyl methacrylate, polystyrene, polycarbonate, cycloolefin (co)polymer resin, acrylonitrile-styrene copolymer, acrylonitrile-butadiene-styrene copolymer, and various elastomers. As said another resin, these resins may be used solely, or two or more of them may be used in combination.

The content of said another resin is preferably 35% by mass or less, more preferably 25% by mass or less, and particularly preferably 10% by mass or less relative to the total mass of the high hardness resin layer.

[Additive]

The high hardness resin layer may contain an additive, etc. As the additive, those described above may be used.

[High hardness resin layer]

The thickness of the high hardness resin layer is preferably 10 to 250 µm, more preferably 30 to 200 µm, and particularly preferably 60 to 150 µm. When the thickness of the high hardness resin layer is 10 µm or more, it is preferred because high surface hardness is obtained. Meanwhile, when the thickness of the high hardness resin layer is 250 µm or less, it is preferred because high impact resistance is obtained.

[Layering of High Hardness Resin Layer on Base Material Layer]

Hereinafter, the case where the high hardness resin layer is layered on the base material layer will be described, though an additional layer may exist between the base material layer and the high hardness resin layer as described above.

The method for layering the high hardness resin layer on the base material layer is not particularly limited. Examples thereof include: a method in which the base material layer and the high hardness resin layer that are individually formed are stacked and bonded by thermocompression; a method in which the base material layer and the high hardness resin layer that are individually formed are stacked and bonded by an adhesive; a method in which the base material layer and the high hardness resin layer are formed by co-extrusion molding; and a method in which the base material layer is subjected to in-mold molding to be integrated with the high hardness resin layer that is formed in advance. Among them, the method of co-extrusion molding is preferred from the viewpoint of the production cost and productivity.

The method of co-extrusion is not particularly limited. For example, in the case of the feed block system, the high hardness resin layer is arranged on one surface of the base material layer using a feed block, it is extruded into a sheet shape using a T-die, and then it is passed through a molding roll while cooling, thereby forming a desired layered body. In the case of the multi-manifold system, the high hardness resin layer is arranged on one surface of the base material layer in a multi-manifold die, it is extruded into a sheet shape, and then it is passed through a molding roll while cooling, thereby forming a desired layered body.

Even in the case where the high hardness resin layer is layered on a layer other than the base material layer, layering can be carried out using the same method as above.

The total thickness of the base material layer and the high hardness resin layer is preferably 0.5 to 3.5 mm, more preferably 0.5 to 3.0 mm, and even more preferably 1.2 to 3.0 mm. When the total thickness is 0.5 mm or more, it is preferred because rigidity of the sheet can be kept. Meanwhile, when the total thickness is 3.5 mm or less, it is preferred because it is possible to prevent deterioration of sensitivity of a touch sensor, for example, when a touch panel is provided under the sheet.

The ratio of the thickness of the base material layer in the total thickness of the base material layer and the high hardness resin layer is preferably 75% to 99%, more preferably 80 to 99%, and particularly preferably 85 to 99%. When the ratio is within the above-described range, a balance between hardness and impact resistance can be achieved.

<Hard Coat Anti-Glare Layer>

The hard coat anti-glare layer is not particularly limited, but it is preferably prepared by subjecting an acrylic hard coat to the anti-glare treatment. In this regard, in this specification, the "acrylic hard coat" means a coating film in which a monomer or oligomer or prepolymer containing a (meth)acryloyl group as a polymerization group is polymerized to form a crosslinked structure. Note that in this specification, (meth)acryloyl indicates methacryloyl and/or acryloyl.

It is preferred that the composition of the acrylic hard coat comprises a (meth)acrylic monomer, a (meth)acrylic oligomer, and a surface modifying agent. In this regard, the acrylic hard coat may further comprise a photopolymerization initiator. In this specification, the photopolymerization initiator indicates a photoradical generator.

The content of the (meth)acrylic monomer is preferably 2 to 98% by mass, more preferably 5 to 50% by mass, and even more preferably 20 to 40% by mass relative to the total mass of the (meth)acrylic monomer, the (meth)acrylic oligomer and the surface modifying agent.

The content of the (meth)acrylic oligomer is preferably 2 to 98% by mass, more preferably 50 to 94% by mass, and even more preferably 60 to 78% by mass relative to the total mass of the (meth)acrylic monomer, the (meth)acrylic oligomer and the surface modifying agent.

The content of the surface modifying agent is preferably 0 to 15% by mass, more preferably 1 to 10% by mass, and even more preferably 2 to 5% by mass relative to the total mass of the (meth)acrylic monomer, the (meth)acrylic oligomer and the surface modifying agent.

When the photopolymerization initiator is contained, the content thereof is preferably 0.001 to 7 parts by mass, more preferably 0.01 to 5 parts by mass, and even more preferably 0.1 to 3 parts by mass relative to 100 parts by mass of the total of the (meth)acrylic monomer, the (meth)acrylic oligomer, and the surface modifying agent.

[(Meth)Acrylic Monomer]

As the (meth)acrylic monomer, those in which a (meth)acryloyl group as a functional group exits in the molecule can be used. Specific examples thereof include a monofunctional monomer, a difunctional monomer, and a trifunctional or higher monomer.

Examples of the monofunctional monomer include (meth)acrylic acid and (meth)acrylic acid ester.

Specific examples of difunctional and/or trifunctional or higher (meth)acrylic monomers include diethylene glycol di(meth)acrylate, dipropylene glycol di(meth)acrylate, tripropylene glycol di(meth)acrylate, 1,6-hexanediol di(meth)acrylate, bisphenol A diglycidyl ether di(meth)acrylate, tetraethylene glycol di(meth)acrylate, neopentylglycol hydroxypivalate diacrylate, neopentylglycol di(meth)acrylate, 1,4-butanediol diacrylate, 1,3-butylene glycol di(meth)acrylate, dicyclopentanyl di(meth)acrylate, polyethylene glycol diacrylate, 1,4-butanediol oligoacrylate, neopentyl glycol oligoacrylate, 1,6-hexanediol oligoacrylate, trimethylol propane tri(meth)acrylate, trimethylol propane ethoxy tri(meth)acrylate, trimethylol propane propoxy tri(meth)acrylate, pentaerythritol tri(meth)acrylate, glyceryl propoxy tri(meth)acrylate, trimethylol propane trimethacrylate, trimethylol propane ethylene oxide adduct triacrylate, glycerin propylene oxide adduct triacrylate, and pentaerythritol tetraacrylate.

The hard coat anti-glare layer may contain one or two or more (meth)acrylic monomers.

[(Meth)Acrylic Oligomer]

Examples of the (meth)acrylic oligomer include a difunctional or higher polyfunctional urethane (meth)acrylate oligomer (hereinafter also referred to as a polyfunctional urethane (meth)acrylate oligomer), a difunctional or higher polyfunctional polyester (meth)acrylate oligomer (hereinafter also referred to as a polyfunctional polyester (meth)acrylate oligomer), and a difunctional or higher polyfunctional epoxy (meth)acrylate oligomer (hereinafter also referred to as a polyfunctional epoxy (meth)acrylate oligomer).

Examples of the polyfunctional urethane (meth)acrylate oligomer include: a urethanation reaction product of a (meth)acrylate monomer having at least one (meth)acryloyloxy group and hydroxyl group in one molecule and a polyisocyanate; and a urethanation reaction product of an isocyanate compound that is obtained by reacting a polyol with a polyisocyanate and a (meth)acrylate monomer having at least one (meth)acryloyloxy group and hydroxyl group in one molecule.

Examples of the (meth)acrylate monomer having at least one (meth)acryloyloxy group and hydroxyl group in one molecule to be used in the urethanation reaction include 2-hydroxyethyl (meth)acrylate, 2-hydroxypropyl (meth)acrylate, 2-hydroxybutyl (meth)acrylate, 2-hydroxy-3-phenoxypropyl (meth)acrylate, glycerin di(meth)acrylate, trimethylol propane di(meth)acrylate, pentaerythritol tri(meth)acrylate, and dipentaerythritol penta(meth)acrylate.

Examples of the polyisocyanate to be used in the urethanation reaction include polyisocyanates (di- or tri-) such as hexamethylene diisocyanate, lysine diisocyanate, isophorone diisocyanate, dicyclohexylmethane diisocyanate, tolylene diisocyanate, xylylene diisocyanate, diisocyanates obtained by hydrogenation of an aromatic isocyanate among these diisocyanates (e.g., diisocyanates such as hydrogenated tolylene diisocyanate and hydrogenated xylylene diisocyanate), triphenylmethane triisocyanate, and dimethylene triphenyl triisocyanate; and polyisocyanates obtained by multimerization of a diisocyanate.

As the polyol to be used in the urethanation reaction, aromatic, aliphatic and alicyclic polyols, a polyester polyol, a polyether polyol, etc. are generally used.

Usually, examples of aliphatic and alicyclic polyols include 1,4-butanediol, 1,6-hexanediol, neopentyl glycol, ethylene glycol, propylene glycol, trimethylolethane, trimethylolpropane, dimethylolheptane, dimethylol propionic acid, dimethylol butyric acid, glycerin, and hydrogenated bisphenol A.

Examples of the polyester polyol include those obtained by a dehydration condensation reaction of the above-described polyol and a polycarboxylic acid. Specific examples of the polycarboxylic acid include succinic acid, adipic acid, maleic acid, trimellitic acid, hexahydrophthalic acid, phthalic acid, isophthalic acid, and terephthalic acid. These polycarboxylic acids may be in the form of an anhydride.

Examples of the polyether polyol include polyalkylene glycol and a polyoxyalkylene-modified polyol that is obtained by a reaction of the above-described polyol or a phenol with alkylene oxide.

The polyfunctional polyester (meth)acrylate oligomer is obtained by a dehydration condensation reaction using (meth)acrylic acid, a polycarboxylic acid and a polyol. Examples of the polycarboxylic acid to be used in the dehydration condensation reaction include succinic acid, adipic acid, maleic acid, itaconic acid, trimellitic acid, pyromellitic acid, hexahydrophthalic acid, phthalic acid, isophthalic acid, and terephthalic acid. These polycarboxylic acids may be in the form of an anhydride. Further, examples of the polyol to be used in the dehydration condensation reaction include 1,4-butanediol, 1,6-hexanediol, diethylene glycol, triethylene glycol, propylene glycol, neopentyl glycol, dimethylolheptane, dimethylol propionic acid, dimethylol butyric acid, trimethylolpropane, ditrimethylolpropane, pentaerythritol, and dipentaerythritol.

The polyfunctional epoxy (meth)acrylate oligomer is obtained by an addition reaction of a polyglycidyl ether and (meth)acrylic acid. Examples of the polyglycidyl ether include ethylene glycol diglycidyl ether, propylene glycol diglycidyl ether, tripropylene glycol diglycidyl ether, 1,6-hexanediol diglycidyl ether, and bisphenol A diglycidyl ether.

The hard coat anti-glare layer may contain one or two or more (meth)acrylic oligomers.

[Surface Modifying Agent]

Examples of the surface modifying agent include those that modify surface performance of the hard coat anti-glare layer such as a leveling agent, an antistatic agent, a surfactant, a water-repellent oil-repellent agent, inorganic particles and organic particles.

Examples of the leveling agent include polyether-modified polyalkylsiloxane, polyether-modified siloxane, polyester-modified hydroxyl group-containing polyalkylsiloxane, polyether-modified polydimethylsiloxane having an alkyl group, modified polyether, and silicon-modified acrylic.

Examples of the antistatic agent include glycerin fatty acid ester monoglyceride, glycerin fatty acid ester organic acid monoglyceride, polyglycerin fatty acid ester, sorbitan fatty acid ester, a cationic surfactant, and an anionic surfactant.

Examples of the surfactant and the water-repellent oil-repellent agent include fluorine-containing surfactants and water-repellent oil-repellent agents such as a fluorine-containing group/lipophilic group-containing oligomer and a fluorine-containing group/hydrophilic group/lipophilic group/UV reactive group-containing oligomer.

Examples of the inorganic particles include silica particles, alumina particles, zirconia particles, silicon particles, silver particles, and glass particles.

Examples of the organic particles include acrylic particles and silicon particles.

The hard coat anti-glare layer may contain one or two or more surface modifying agents.

[Photopolymerization Initiator]

Examples of the photopolymerization initiator include a monofunctional photopolymerization initiator. Specific examples thereof include: 4-(2-hydroxyethoxy)phenyl(2-hydroxy-2-propyl) ketone [Darocur 2959: manufactured by Merck]; α-hydroxy-α,α'-dimethylacetophenone [Darocur 1173: manufactured by Merck]; acetophenone-based initiators such as methoxyacetophenone, 2,2'-dimethoxy-2-phenylacetophenone [Irgacure 651] and 1-hydroxy-cyclohexylphenylketone; benzoin ether-based initiators such as benzoin ethyl ether and benzoin isopropyl ether; and other materials including halogenated ketone, acylphosphinoxide, and acylphosphonate.

[Method for Forming Hard Coat Anti-Glare Layer]

The method for forming the hard coat anti-glare layer is not particularly limited. For example, it can be formed by applying a hard coat solution onto a layer that is to be positioned under the hard coat anti-glare layer (e.g., high hardness resin layer), followed by performing photopolymerization.

The method of applying the hard coat solution (polymerizable composition) is not particularly limited, and a publicly-known method can be used. Examples thereof include a spin-coating method, a dipping method, a spraying method, a slide coating method, a bar coating method, a roll coating method, a gravure coating method, a meniscus coating method, a flexographic printing method, a screen printing method, a beat coating method, and a brushing method.

As a lamp to be used for light irradiation at the time of photopolymerization, a lamp having a light emission distribution at a light wavelength of 420 µm or lower is used. Examples thereof include a low-pressure mercury lamp, a medium-pressure mercury lamp, a high-pressure mercury lamp, an ultrahigh pressure mercury lamp, a chemical lamp, a black light lamp, a microwave-excited mercury lamp, and a metal halide lamp. Among them, the high-pressure mercury lamp or metal halide lamp is preferred because it efficiently emits a light in the active wavelength region of the initiator and it does not often emit a short-wavelength light, which reduces viscoelastic properties of a polymer obtained due to crosslinking, or a long-wavelength light, which heats and evaporates a reaction composition.

The irradiation intensity of the above-described lamp is a factor that influences the polymerization degree of the obtained polymer and is suitably controlled depending on every performance of an intended product. When blending a usual cleavage-type initiator having an acetophenone group, the illuminance is preferably 0.1 to 300 mW/cm$^2$. It is particularly preferred that the metal halide lamp is used and that the illuminance is 10 to 40 mW/cm$^2$.

A photopolymerization reaction is inhibited by oxygen in the air or oxygen dissolved in a reactive composition. For this reason, light irradiation is desirably carried out by using a technique that can prevent reaction inhibition caused by oxygen. As one of such techniques, there is a method in which a reactive composition is covered with a film made of polyethylene terephthalate or Teflon to block contact with oxygen and the reactive composition is irradiated with a light through the film. Alternatively, the composition may be irradiated with a light through a light-transmitting window under an inert atmosphere in which oxygen is replaced with an inert gas such as nitrogen gas and carbon dioxide gas.

When light irradiation is carried out under an inert atmosphere, a constant amount of an inert gas is continuously introduced in order to keep the oxygen concentration in the atmosphere at a low level. By this introduction of the inert gas, an air flow is generated on the surface of a reactive composition to cause monomer evaporation. For suppressing the level of monomer evaporation, the airflow velocity of the inert gas, as the velocity relative to a hard coat solution-applied layered body that moves under the inert gas atmosphere, is preferably 1 m/sec or less, and more preferably 0.1 m/sec or less. When the airflow velocity is within the above-described range, monomer evaporation due to the air flow is substantially suppressed.

For the purpose of improving adhesion of the hard coat anti-glare layer, the coated surface may be subjected to a pretreatment. Examples of the pretreatment include publicly-known methods such as a sandblasting method, a solvent treatment method, a corona discharge treatment method, a chromic acid treatment method, a flame treatment method, a hot air treatment method, an ozone treatment method, an ultraviolet treatment method, and a primer treatment method using a resin composition.

Note that the anti-glare treatment is not particularly limited, and examples thereof include a method in which an anti-glare mold is used. For example, there is a method in which: firstly a high hardness resin layer, a coating film that is obtained by applying a reactive composition, and an anti-glare mold are layered in this order; and secondly, the reactive composition is photopolymerized to be released from the anti-glare mold. The photopolymerized body of the reactive composition (hard coat anti-glare layer) has, on the surface thereof in contact with the anti-glare mold, a shape in which the rough surface of the anti-glare mold is reflected.

Note that the material of the anti-glare mold is not particularly limited as long as it transmits UV light, and glass, transparent resin or the like is used. Examples of other methods for the anti-glare treatment include a method of adding particles to a reactive composition, and a method of treating the surface of a hard coat anti-glare layer obtained. The maximum valley depth (Rv) of the recesses and protrusions of the hard coat anti-glare layer can be adjusted by controlling the type of the anti-glare mold to be used (the haze of the surface, thickness, etc.), the amount of particles to be added, etc.

The hard coat anti-glare layer may be further modified. For example, any one or more of an antireflection treatment, an antifouling treatment, an antistatic treatment, a weather resistance treatment, and an anti-glare treatment can be applied thereto. The methods for these treatments are not particularly limited, and publicly-known methods can be used. Examples thereof include a method of applying a reflection-reducing paint, a method of depositing a dielectric thin film and a method of applying an antistatic paint.

[Hard Coat Anti-Glare Layer]

The thickness of the hard coat anti-glare layer is preferably 1 to 40 µm, and more preferably 2 to 10 µm. When the thickness of the hard coat anti-glare layer is 1 µm or more, it is preferred because sufficient hardness can be obtained. Meanwhile, when the thickness is 40 µm or less, it is preferred because the generation of a crack at the time of the curving process can be suppressed. Note that the thickness of the hard coat anti-glare layer can be measured by observing the cross section thereof using a microscope or the like and performing the actual measurement from the coating film interface to the surface.

As described above, the maximum valley depth (Rv) of the recesses and protrusions of the hard coat anti-glare layer is 0.9 µm or less, preferably 0.8 µm or less, and more preferably 0.6 µm or less. In this specification, the "maximum valley depth (Rv) of the recesses and protrusions" means a value measured by the method in the Examples.

The pencil hardness of the surface of the hard coat anti-glare layer is preferably HB or harder, more preferably H or harder, even more preferably 2H or harder, and particularly preferably 2H to 3H. Note that the pencil hardness of the hard coat anti-glare layer is a result obtained by evaluation by the pencil scratch hardness test in accordance with JIS K 5600-5-4:1999. Specifically, the highest hardness of the pencil, with which the surface of the hard coat anti-glare layer is not damaged when the pencil is pressed against the surface at an angle of 45° with respect to the surface with a load of 750 g, while increasing the hardness thereof, is evaluated as the pencil hardness.

<Protective Film>

The laminated resin sheet for molding may have a protective film. In one embodiment, a laminated protective film, in which a first protective film and a second protective film are layered, is disposed on both the outermost surfaces of the laminated resin sheet for molding. In this case, the second protective film is disposed at the outer side. For example, when the laminated resin sheet for molding is in the form of base material layer-high hardness layer-hard coat anti-glare layer, it preferably becomes in the form of laminated protective film-base material layer-high hardness layer-hard coat anti-glare layer-laminated protective film. Further, when the laminated resin sheet for molding is in the form of hard coat anti-glare layer-high hardness layer-base material layer-high hardness layer-hard coat anti-glare layer, it preferably becomes in the form of laminated protective film-hard coat anti-glare layer-high hardness layer-base material layer-high hardness layer-hard coat anti-glare layer-laminated protective film.

When forming a resin sheet for molding, for example, when bending a resin sheet for molding, usually, the heated resin sheet for molding is pressed to be subjected to thermal bending using a metal mold, a wooden mold, a resin mold or the like. In this case, transfer of a scratch of a mold or the like, biting of a foreign matter and an orange peel on the surface of a molded article may be caused. These problems can be prevented or suppressed when the laminated protective film is provided on both the surfaces of the laminated resin sheet for molding.

Note that the laminated protective film can be disposed only on one of the outermost surfaces of the laminated resin sheet for molding.

Regarding the laminated protective film, it is preferred that the first protective film and the second protective film are layered, and that the second protective film is disposed at the outer side.

In one embodiment, the first protective film is preferably a polyolefin-based film having a melting point of 100 to 130° C. In this case, it is preferred because it melts at the time of thermoforming and plays a role as a cushioning material when there is a scratch or dust on the surface of a mold for hot pressing, and transfer of a mold scratch or a dent on a molded article can be suppressed.

The polyolefin-based film having a melting point of 100 to 130° C. is not particularly limited, and examples thereof include a polyethylene film, and a film made of a mixture of polyethylene and polypropylene. In the case of the film made of a mixture of polyethylene and polypropylene, a melting point of 140° C. or higher that is derived from polypropylene may be measured, but it is sufficient when a melting point of 100° C. to 130° C. is measured. Examples of commercially-available products thereof include MX-217Y and MX-318N (manufactured by Nihon Matai Co., Ltd.), and E-MASK 100 (manufactured by Nitto Denko Corporation).

The thickness of the first protective film is preferably 20 to 100 μm, and more preferably 30 to 80 μm.

Further, in one embodiment, the second protective film is preferably a polyolefin-based film or PET (polyethylene terephthalate)-based film, which has a melting point of 140° C. or higher. In this case, it is preferred because fusion bonding of the laminated resin sheet for molding to the mold can be prevented or suppressed.

Examples of the polyolefin-based film having a melting point of 140° C. or higher include a polypropylene film. Examples of commercially-available products thereof include HITALEX L-3330 and L-3340 (manufactured by Hitachi Chemical Co., Ltd.), and TORETEC R200A (manufactured by Toray Advanced Film Co., Ltd.).

Examples of the PET-based film having a melting point of 140° C. or higher include a polyethylene terephthalate film. Examples of commercially-available products thereof include K3940B (manufactured by Hitachi Chemical Co., Ltd.).

The thickness of the second protective film is preferably 20 to 100 μm, and more preferably 30 to 80 μm.

In one embodiment, it is preferred that a protective film, in which the first protective film is a polyolefin-based film having a melting point of 100 to 130° C. and the second protective film is a polyolefin-based film having a melting point of 140° C. or higher, is provided.

Further, in one embodiment, it is preferred that a laminated protective film, in which the first protective film is a polyolefin-based film having a melting point of 100 to 130° C. and the second protective film is a PET-based film, is provided.

A protective film composed of one layer may be used, or a laminated protective film composed of 3 or more layers may also be used.

<Laminated Resin Sheet for Molding>

The pencil hardness of the laminated resin sheet for molding is preferably 2H or harder, more preferably H to 4H, and even more preferably 3H to 4H. The pencil hardness of the laminated resin sheet for molding means the highest hardness of the pencil, with which the surface of the hard coat anti-glare layer is not damaged when the pencil is pressed against the surface at an angle of 45° with respect to the surface with a load of 750 g, while increasing the hardness thereof (the pencil scratch hardness test in accordance with JIS K 5600-5-4:1999).

The haze of the laminated resin sheet for molding of the present invention is preferably 30% or less, more preferably 25% or less, even more preferably 12% or less, particularly preferably 0.1 to 12%, more particularly preferably 2 to 12%, and most preferably 4 to 12%. In this specification, the haze is a value measured using an HR-100 type (manufactured by Murakami Color Research Laboratory Co., Ltd.) in accordance with JIS K 7136:2000.

<Molded Article>

According to one embodiment of the present invention, a molded article, which is obtained by molding with use of the above-described laminated resin sheet for molding, is provided.

The molding method is not particularly limited, but thermoforming is suitable in view of characteristics of the laminated resin sheet for molding. Thermoforming can be carried out by a method usually used in the art. Specific examples of the method for thermoforming include hot press molding, pressure forming, vacuum forming and TOM molding.

The molding temperature is preferably 100 to 200° C.

EXAMPLES

Hereinafter, working examples of the present invention will be described, but the present invention is not limited to embodiments of the working examples.

<Measurement of Glass Transition Point (Tg)>

The glass transition point of each of the polycarbonate resins and high hardness resins used in the Examples and Comparative Examples is a temperature obtained by carrying out the measurement using a differential scanning calorimeter DSC7020 (manufactured by Hitachi High-Tech Science Corporation) and 10 mg of a sample at a temperature raising rate of 10° C./min and calculation according to a midpoint method.

<Measurement of Pencil Hardness of Laminated Resin Sheet for Molding>

Each of the laminated resin sheets for molding produced in the Examples and Comparative Examples was evaluated by the pencil scratch hardness test in accordance with JIS K 5600-5-4:1999. The highest hardness of the pencil, with which the surface of the hard coat anti-glare layer was not damaged when the pencil was pressed against the surface at an angle of 45° with respect to the surface with a load of 750 g, while increasing the hardness thereof, was evaluated as the pencil hardness. The hardness of 2H or harder was evaluated as acceptable.

<Measurement of haze of laminated resin sheet for molding>

Evaluation was made in accordance with JIS K 7136:2000 using an HR-100 type (manufactured by Murakami Color Research Laboratory Co., Ltd.).

<Measurement of Rv of laminated resin sheet for molding>

Using a surface roughness measuring device "SURFCOM480A" manufactured by Tokyo Seimitsu Co., Ltd., the maximum valley depth (Rv) of the roughness curved surface was calculated according to the method defined in JIS B 0601:1994.

<Evaluation regarding presence or absence of generated crack in hard coat anti-glare layer>

Each of the laminated resins for molding produced in the Examples and Comparative Examples was subjected to thermoforming, and the presence or absence of a crack in the 50 mm R portion, 75 mm R portion, or 100 mm R portion was confirmed.

Example 1

(Production of Laminated Resin Sheet for Molding)

A layered body consisting of a base material layer and a high hardness resin layer was formed using a multilayer extrusion apparatus having a single screw extruder with a screw diameter of 35 mm, a single screw extruder with a screw diameter of 65 mm, a feed block connected to the respective extruders and a T-die connected to the feed block.

Specifically, a high hardness resin (B2) (copolymer containing 21% by mass of a methyl methacrylate structural unit, 64% by mass of a styrene structural unit and 15% by mass of a maleic anhydride structural unit; glass transition temperature: 124° C.; RESISFY R100 (manufactured by Denka)) was continuously introduced into the single screw extruder with the screw diameter of 35 mm and extruded at a cylinder temperature of 230° C. and a discharge rate of 2.6 kg/hour. Further, a polycarbonate resin (Iupizeta T-1380; glass transition temperature: 125° C.; manufactured by Mitsubishi Gas Chemical Company, Inc.) was continuously introduced into the single screw extruder with the screw diameter of 65 mm and extruded at a cylinder temperature of 240° C. and a discharge rate of 50.0 kg/hour.

The extruded high hardness resin and the extruded polycarbonate resin were introduced into the feed block having a distribution pin for two types of two layers, and the high hardness resin and the polycarbonate resin were layered at 240° C. It was further introduced into the T-die at 240° C. to be extruded into a sheet shape, and using 3 mirror-finished rolls each at 120° C., 130° C., and 190° C. from the upstream side, it was transferred on the mirror surfaces and cooled, thereby obtaining the layered body consisting of the high hardness resin layer and the polycarbonate resin layer (base material layer). The thickness of the obtained layered body was 2.0 mm, and the thickness of the high hardness resin layer near the center thereof was 60 µm.

A hard coat anti-glare layer was formed on the high hardness resin layer side of the layered body obtained above. The material of the hard coat anti-glare layer is as follows: 60% by mass of U6HA (manufactured by Shin-Nakamura Chemical Co., Ltd., hexafunctional urethane acrylate oligomer); 35% by mass of 4EG-A (manufactured by Kyoeisha Chemical Co., Ltd., PEG200 #diacrylate); 5% by mass of RS-90 (manufactured by DIC, fluorine-containing group/hydrophilic group/lipophilic group/UV reactive group-containing oligomer); and 1 part by mass of a photopolymerization initiator 1-184 (manufactured by BASF, compound name: 1-hydroxy-cyclohexyl phenyl ketone) relative to 100 parts by mass of a mixture of the aforementioned U6HA, 4EG-A and RS-90.

The above-described material was applied to the layered body using a bar coater, and the concave-convex surface of a mirror surface frosted glass plate having a haze of 0.3% and a thickness of 2 mm was attached thereon. It was irradiated with a metal halide lamp (20 mW/cm$^2$) from above the frosted glass plate for 5 seconds to cure the hard coat, and the hard coat anti-glare layer was bonded. At the end, the frosted glass plate was removed, thereby preparing a laminated resin sheet for molding.

The thickness of the formed hard coat anti-glare layer was 6 µm. The haze of the laminated resin sheet for molding was 0.2%.

MX-318N (film made of a mixture of polyethylene and polypropylene; melting point: 121° C., 161° C.; manufactured by Nihon Matai Co., Ltd.) was placed on both the surfaces of the above-described laminated resin sheet for molding, and it was pressure-bonded (load: 5 kg/cm$^2$) between 2 rubber rolls at room temperature to bond the first protective film. Next, HITALEX L-3330 (polypropylene film; melting point: 164° C.; manufactured by Hitachi Chemical Co., Ltd.) was placed on both the first protective film surfaces, and it was pressure-bonded between the rubber rolls in the same manner to bond the second protective film, thereby obtaining a resin sheet for molding.

(Production of Molded Article)

The laminated resin sheet for molding produced above was subjected to hot pressing to produce a molded article. Note that a hot pressing machine used has a mechanism in which mold clamping is driven by a servomotor. In this regard, the maximum value of the mold clamping force is 3000 kgf.

The produced laminated resin sheet for molding was put into a shelf dryer with its temperature being set at 120° C., and preheating was performed for 3 minutes. The temperature of the sheet taken out from the shelf dryer was 80° C.

50 seconds after the laminated resin sheet for molding was taken out from the shelf dryer, the sheet was set on a lower mold of an aluminum mold for hot pressing (FIG. 1).

The laminated resin sheet for molding was subjected to hot press molding using the aluminum mold for hot pressing (FIG. 1) with a clearance (gap between an upper mold and a lower mold for sandwiching a sheet for molding) of 2 mm and a curvature radius R of the lower mold of 50 mm. The temperatures of the upper and lower molds were both 122° C., the mold clamping force was 200 kgf, and the pressing time was 3 minutes.

Example 2

A laminated resin sheet for molding and a molded article were produced in manners similar to those in Example 1, except that a frosted glass plate having a haze of 1.2% and a thickness of 2 mm was used.

Example 3

A laminated resin sheet for molding and a molded article were produced in manners similar to those in Example 1, except that a frosted glass plate having a haze of 2.5% and a thickness of 2 mm was used.

Example 4

A laminated resin sheet for molding and a molded article were produced in manners similar to those in Example 1, except that a frosted glass plate having a haze of 5.0% and a thickness of 2 mm was used.

Example 5

A laminated resin sheet for molding and a molded article were produced in manners similar to those in Example 1, except that a frosted glass plate having a haze of 8.0% and a thickness of 2 mm was used.

Example 6

A laminated resin sheet for molding and a molded article were produced in manners similar to those in Example 1, except that a frosted glass plate having a haze of 11% and a thickness of 2 mm was used.

Example 7

A laminated resin sheet for molding and a molded article were produced in manners similar to those in Example 1, except that a frosted glass plate having a haze of 13% and a thickness of 2 mm was used.

Comparative Example 1

A laminated resin sheet for molding and a molded article were produced in manners similar to those in Example 1, except that a frosted glass plate having a haze of 14% and a thickness of 2 mm was used.

Comparative Example 2

A laminated resin sheet for molding and a molded article were produced in manners similar to those in Example 1, except that a frosted glass plate having a haze of 24% and a thickness of 2 mm was used.

Comparative Example 3

A laminated resin sheet for molding and a molded article were produced in manners similar to those in Example 1, except that a frosted glass plate having a haze of 23% and a thickness of 2 mm was used.

Comparative Example 4

A laminated resin sheet for molding and a molded article were produced in manners similar to those in Example 1, except that a frosted glass plate having a haze of 27% and a thickness of 2 mm was used.

Regarding the laminated resin sheets for molding produced in the Examples and Comparative Examples, Rv, the pencil hardness and the haze thereof were measured. Further, the molded articles were evaluated with respect to the presence or absence of a crack in the hard coat anti-glare layer. The results are shown in Table 1.

TABLE 1

| | Laminated resin sheet for molding | | | Molded article Presence or absence of crack in hard coat anti-glare layer |
|---|---|---|---|---|
| | Rv (μm) | Pencil Hardness | Haze (%) | |
| Example 1 | 0.02 | 2H | 0.2 | Absent |
| Example 2 | 0.42 | 2H | 1.0 | Absent |
| Example 3 | 0.27 | 2H | 2.0 | Absent |
| Example 4 | 0.59 | 2H | 4.0 | Absent |
| Example 5 | 0.75 | 2H | 7.0 | Absent |
| Example 6 | 0.79 | 2H | 10 | Absent |
| Example 7 | 0.80 | 2H | 12 | Absent |
| Comparative Example 1 | 1.00 | 2H | 13 | Present |
| Comparative Example 2 | 0.92 | 2H | 23 | Present |
| Comparative Example 3 | 0.91 | 2H | 22 | Present |
| Comparative Example 4 | 1.10 | 2H | 26 | Present |

It is understood that the laminated resin sheets for molding in Examples 1-7 have an anti-glare layer but have excellent transparency. Moreover, it is understood that no abnormal appearance is caused at the time of molding. Furthermore, it is understood that the laminated resin sheets for molding have high hardness.

The several embodiments of the present invention were described above, but these embodiments were presented as examples and it is not intended to limit the scope of the invention thereby. These novel embodiments can be practiced in other various modes and can be omitted, substituted or modified variously without departing from the gist of the present invention. These embodiments and modifications thereof are included in the scope or gist of the invention and also included in the scope of the inventions recited in the claims and equivalents thereof.

The invention claimed is:

1. A laminated resin sheet for molding, which comprises:
a high hardness resin layer containing a high hardness resin;
a base material layer which contains a polycarbonate resin (a1) and is disposed on one surface side of the high hardness resin layer; and
a hard coat anti-glare layer disposed on the other surface side of the high hardness resin layer,
wherein the high hardness resin comprises at least one selected from the group consisting of:
Resin (B2), which is a copolymer (D) containing 6 to 77% by mass of a (meth)acrylic acid ester structural unit, 15 to 71% by mass of a styrene structural unit, and 8 to 23% by mass of an unsaturated dicarboxylic acid structural unit;
Resin (B3), which is a polymer containing a structural unit (c) represented by general formula (5) below:

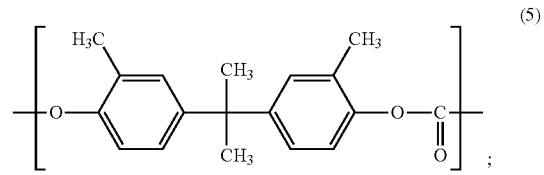

Resin (B4), which is a copolymer (G) containing 5 to 20% by mass of a styrene structural unit, 60 to 90% by mass of a (meth)acrylic acid ester structural unit, and 5 to 20% by mass of an N-substituted maleimide structural unit;

Resin (B5), which is a polymer containing a structural unit (e) represented by general formula (7) below:

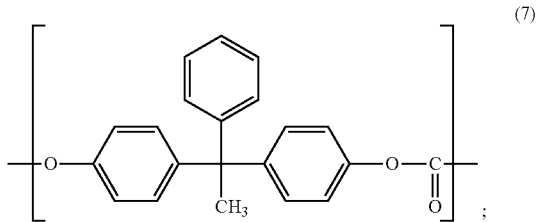

(7)

and

Resin (B6), which is a copolymer (H) containing 50 to 95% by mass of a styrene structural unit and 5 to 50% by mass of an unsaturated dicarboxylic acid structural unit;

wherein the glass transition point (Tg1) of the high hardness resin and the glass transition point (Tg2) of the polycarbonate resin (a1) satisfy the following relationship:

$-10°$ C.$\leq(Tg1-Tg2)\leq 40°$ C., wherein the maximum valley depth (Rv) of the recesses and protrusions of the hard coat anti-glare layer is 0.9 μm or less; and wherein the laminated resin sheet for molding has a haze of 12% or less.

2. The laminated resin sheet for molding according to claim 1, wherein the polycarbonate resin (a1) is an aromatic polycarbonate resin.

3. The laminated resin sheet for molding according to claim 2, wherein the aromatic polycarbonate resin contains a structural unit represented by general formula (3a):

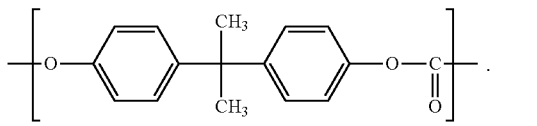

(3a)

4. The laminated resin sheet for molding according to claim 1, wherein the content of the polycarbonate resin (a1) is 75 to 100% by mass relative to the total mass of the base material layer.

5. The laminated resin sheet for molding according to claim 1, wherein the Resin (B3) is a copolymer further containing a structural unit (d) represented by general formula (6) below:

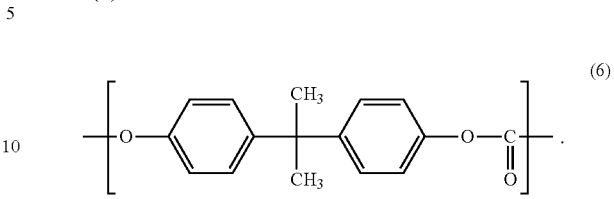

(6)

6. The laminated resin sheet for molding according to claim 1, wherein the content of the high hardness resin is 70 to 100% by mass relative to the total mass of the high hardness resin layer.

7. The laminated resin sheet for molding according to claim 1, wherein the total thickness of the base material layer and the high hardness resin layer is 0.5 to 3.5 mm.

8. The laminated resin sheet for molding according to claim 1, wherein the ratio of the thickness of the base material layer in the total thickness of the base material layer and the high hardness resin layer is 75% to 99%.

9. The laminated resin sheet for molding according to claim 1, wherein the pencil hardness of the surface of the hard coat anti-glare layer is 2H or harder.

10. The laminated resin sheet for molding according to claim 1, wherein:
   a laminated protective film, in which a first protective film and a second protective film are layered, is disposed on both the outermost surfaces of the laminated resin sheet for molding; and
   the second protective film is disposed at the outer side.

11. The laminated resin sheet for molding according to claim 10, which has the laminated protective film, wherein:
   the first protective film is a polyolefin-based film having a melting point of 100 to 130° C.; and
   the second protective film is a polyolefin-based film having a melting point of 140° C. or higher.

12. The laminated resin sheet for molding according to claim 10, which has the laminated protective film, wherein:
   the first protective film is a polyolefin-based film having a melting point of 100 to 130° C.; and
   the second protective film is a PET-based film.

13. A molded article obtained by molding with use of the laminated resin sheet for molding according to claim 1.

* * * * *